UNITED STATES PATENT OFFICE.

R. BERKELEY FITTS, OF PHILADELPHIA, PENNSYLVANIA, ASSIGNOR TO HIMSELF AND GEORGE W. WAITT, OF SAME PLACE.

IMPROVEMENT IN PREPARING GRAIN FOR FOOD.

Specification forming part of Letters Patent No. 115,947, dated June 13, 1871.

*To whom it may concern:*

Be it known that I, R. BERKELEY FITTS, of Philadelphia, in the county of Philadelphia and State of Pennsylvania, have, as I believe, invented new and useful Improvements in Preparing Wheat and other Grain for Food; and I do hereby declare the following to be a full and exact description of the same.

The object of my invention is to treat wheat and other grain with a view of removing any animalcules that may be in, and any musty odor it may have acquired, or other impurities, or want of best conditions, and also to remove the gelatinous properties of the hull, in order that the entire grain may be equally friable, and thus the phosphatic or bone-forming elements may be utilized, as well as the starchy portions, bringing the nutritious properties into a condition to be more readily and easily digested in the human stomach and more perfectly assimilated.

My invention consists in subjecting the grains first to the action of steam applied directly thereto under pressure, and following this with dry heat, and continuing the same until the grain is in proper condition for the mill or to be put up in suitable packages for the commercial agent and the consumer. This process of steam treatment, the grain being in a wire-cloth rotating cylinder inclosed in a steam-chest, should be kept up from five to ten minutes, according to the condition of the grain and the force and pressure of the steam.

From thirty to fifty pounds' pressure to the square inch will afford from 275° to 300° of heat, (Fahrenheit,) and as my object is to secure a cooking of the grain and a conversion of a portion of the starch to dextrine this extent of pressure may not be too much.

The drying may be by any suitable means to bring the grain to a crisp and thoroughly desiccated condition, and well fitted for the mill, or for preparation for the table without grinding.

Wheat thus treated may be used either in the whole kernel or as cracked wheat, cooked and served up as ordinary coarse wheat or cracked wheat, only requiring much less cooking; or, on being ground into meal, may well take the place of buckwheat for pan or griddle cakes, presenting itself altogether more palatable, and, in point of dietetic economy, as proper food for the human system possessing manifold superiority.

Indian corn treated in this way, either in the whole kernel or broken into hominy, is vastly improved, the tendency to sour or fall away from its delicious natural flavor being overcome—a very important matter in keeping and in transportation, especially in summer time or warm climates.

The restoration of grain, corn, wheat, rye, or barley to its normal state of sweetness and purity, which seems almost inseparable from the ordinary modes of transportation and storage, I deem a very important feature of my invention.

I put up the products of this treatment in sacks, boxes, barrels, or any packages, suitable for the mill, or for the consumer without grinding, when preferred. The cracked grain, or that ground into meal or flour, I put up also convenient for the commercial agent and the consumer.

What I claim as my invention, and desire to secure by Letters Patent, is—

1. The within-described treatment of grain to the purifying and cooking by steam, followed by dry heat, for the purposes specified.

2. The product of the above-described treatment as a new commercial article.

In testimony whereof I have signed my name to this specification in the presence of two subscribing witnesses.

R. BERKELEY FITTS.

Witnesses:
D. C. COLBY,
JAMES STROUD.